(12) United States Patent
Porter (10) Patent No.: US 8,548,902 B2
(45) Date of Patent: Oct. 1, 2013

(54) SYSTEM FOR ONLINE LENDING SERVICES VIA AN APPLICATION SERVICE PROVIDER NETWORK

(76) Inventor: Larry Porter, Owings Mills, MD (US)

(*) Notice: Subject to any disclaimer, the term of this patent is extended or adjusted under 35 U.S.C. 154(b) by 2519 days.

(21) Appl. No.: 10/641,974

(22) Filed: Aug. 15, 2003

(65) Prior Publication Data

US 2011/0112946 A1  May 12, 2011

(51) Int. Cl.
*G06Q 40/00* (2012.01)
(52) U.S. Cl.
USPC .............. 705/38; 705/35; 705/36; 707/756; 707/804
(58) Field of Classification Search
USPC ........................................................ 705/35
See application file for complete search history.

(56) References Cited

U.S. PATENT DOCUMENTS

| | | | | |
|---|---|---|---|---|
| 5,940,812 A * | 8/1999 | Tengel et al. | ................... | 705/38 |
| 6,088,700 A * | 7/2000 | Larsen et al. | ......................... | 1/1 |
| 6,523,063 B1 * | 2/2003 | Miller et al. | ................... | 709/206 |
| 6,898,574 B1 * | 5/2005 | Regan | ............................ | 705/38 |
| 6,990,514 B1 * | 1/2006 | Dodrill et al. | ................. | 709/206 |
| 7,472,089 B2 * | 12/2008 | Hu et al. | .......................... | 705/38 |
| 7,769,681 B2 * | 8/2010 | Misraje et al. | .................. | 705/38 |
| 2002/0029256 A1 * | 3/2002 | Zintel et al. | .................... | 709/218 |
| 2002/0065831 A1 * | 5/2002 | DePaolo | .................... | 707/104.1 |
| 2003/0233316 A1 * | 12/2003 | Hu et al. | ......................... | 705/38 |

OTHER PUBLICATIONS

Www.xslstylusstudio, "xml to pdf conversion", Jun. 19, 2001, www.mulberrytech.com.*
Doug Tidwell, "Transforming XML into PDF", IBM Developerworks, Nov. 2000.*

* cited by examiner

*Primary Examiner* — Rajesh Khattar
*Assistant Examiner* — Arunava Chakravarti
(74) *Attorney, Agent, or Firm* — Rothwell, Figg, Ernst & Manbeck, P.C.

(57) ABSTRACT

A method for online lending services with the creation and population of loan applications and other related documents in Portable Document Format (PDF) for subsequent access by applicant and other entities. Consumers use their Web browsers for access and said method includes an Application Service Provider (ASP) architecture, a loan origination site interface, and a secure server facility.

20 Claims, 4 Drawing Sheets

SYSTEM FOR ONLINE LENDING SERVICES VIA AN APPLICATION SERVICE PROVIDER NETWORK

CROSS-REFERENCE TO RELATED APPLICATIONS

The present application derives priority from Provisional Patent Application No. 60/404,223 filed on 15 Aug. 2002.

BACKGROUND OF THE INVENTION

1. Field of the Invention

The present invention relates to the delivery of online lending services and, more specifically, to a system for the delivery of online lending services by an application service provider using an internet web site that seamlessly integrates the efforts of any mortgage origination source with a lender network, thereby facilitating the flow of information between all traditional participants in a mortgage transaction.

2. Description of the Background

Online clearinghouses, lender networks, and other loan origination sources ("lead sources") for various types of loans are fast gaining in popularity. For mortgage loans, Lending Tree, Inc. is a well known example. By visiting the Lendingtree.com website, consumers can fill out a single application form online which contains basic information about the purpose of the loan and the applicant's creditworthiness. The information is passed to participating banks and lender institutions which pre-screen the application to determine if the application meets their general requirements, and then if it does they review the application and may offer a "prequalification" to the consumer inclusive of specific loan terms—interest rate, closing costs, etc. Typically, within 24 hours of the loan application, the applicant will receive as many as four "prequalifications" to choose from for each application submitted. The banks are able to set their own standards about what sort of applications they wish to review. Using criteria the banks have supplied, Lending Tree automatically forwards the lead to four institutions best suited to make the particular loan. Lending Tree charges the member banks a "transmission fee" per each application that the lender decides to review. After reviewing the application, the lender may respond to the consumer with a specific offer. If the consumer accepts the offer and the loan actually closes, Lending Tree additionally charges the lender a "closed loan fee". Presently, Lending Tree charges banks $9 for each consumer lead, bringing $36 total if the lead goes to four banks, plus an extra $300 to $800 if the lead evolves into an actual mortgage loan.

Last year, more than 1.4 million consumers applied for loans via Lending Tree, enabling the site's lenders to book more than $12 billion in loans from its leads. Moreover, there are other loan origination sites. E-LOAN is Lending Tree's closest competitor, originating $7.3 billion in loans last year.

Leads generated by lead sources are passed on to "loan origination sources" such as traditional mortgage brokers and brokerage websites. These loan origination sources make contact with clients, solicit applications, and pre-qualify applicants. After prequalification, the loan originators will submit the loan application to one or more lenders (or a lender network such as LendingTree.com) in return for an origination fee. Many loan origination sources use origination source software such as Calyx® Point® to give themselves instant access to resources, products, and services they need for originating loans, including interfaces and direct connections to lenders and mortgage service companies. The Point software offers a complete platform for managing all aspects of the loan process, including marketing, prequalification, origination, automated underwriting, processing, and closing.

In the case of most mortgage lead sources, loan origination sources and lender networks (including Lending Tree and Point), the businesses are data intensive and each requires a hosting server for the website, a large database and associated software, and very secure "back-end" network technology including encryption, to protect the data transmitted between the consumers, the loan origination server facility, and lenders. Differing database formats prevent the seamless passing of data from the lead source to the loan origination source, and on to the lender or lender network, and much of the data needs to be retyped. Moreover, there is no inherent tracking of an application throughout the process, and no provision for allowing dynamic changes to the application information while keeping all involved parties apprised of any action taken by the another party. With existing mortgage origination software such as Point, once the consumer completes the loan qualification form the data from the form is used to populate a database. The consumer can never again retrieve the application in its original format. This is because the applications are written in Extensible Markup Language (XML), a universal format for structured documents and data on the Web. XML loses its formatting when updated, transmitted and recalled on various systems. The consumer applicant is deprived of the ability to review their own loan application throughout the application process.

Due to the foregoing difficulties, there is a growing demand by online mortgage loan origination sources as well as lead sources to outsource some of the functions involved in their respective processes. For example, data warehousing, software maintenance, etc. are functions that can easily be outsourced.

Unfortunately, outsourcing compels a change from the existing "back-end" architecture in which the applications and databases reside on separate servers both at the lead source and at the loan origination source.

It would be greatly advantageous to provide a 2-tiered Application Service Provider (ASP) architecture by which front-end clients can securely communicate with the database (back-end). An ASP is a vendor that supplies software applications and/or software services to consumers over the Internet. An ASP rents or leases application software primarily to small and mid-sized businesses (customers). The customer's software applications and data are supported and maintained by the ASP on servers in the ASP's secure centrally managed server facility (data center). The ASP also handles the network administration. Customers access their applications and related data via the Internet, Virtual Private Networks (VPN), dedicated leased lines (e.g., a T-1 line), or dial-up modem connections.

The ASP concept allows a company to rent powerful end-to-end application solutions for significantly less than buying, deploying and supporting them in-house. Additionally, data center costs are eliminated or significantly reduced, and the company can focus on its core competencies rather than technology. However, it is not a straightforward proposition to develop an ASP model for the mortgage lending industry. A successful architecture must facilitate the flow of information throughout the mortgage lending process beginning with the consumer completion of a loan application (lead generation) and through submission to loan origination sources and lenders, and back, all while allowing dynamic changes to the application information, and all while keeping all involved parties apprised of any action taken by the another party. This would entail a particular ASP architecture, plus exhaustive data management and communication protocols. Rather than storing data in conventional databases in traditional extensible mark-up language (XML), it is envisioned that a more fixed cross-platform document format such as the Portable Document Format (PDF) would accomplish a more favorable result in such a model.

Adobe® Portable Document Format (PDF) is the open standard for electronic document distribution. PDF is a universal file format that preserves all of the fonts, formats, images, graphics, and color of any source document no matter what application and platform was used to create it. Anyone can then open the document across a broad range of hardware and software, and it will look exactly as the author intended, with layout, fonts, links, and images intact. PDF solves a number of problems inherent in transferring files from one platform or application to another. Often a recipient of a file cannot open it because their machine does not run the software application used to create the file. With PDF files, anyone anywhere can open the file. Formatting, fonts and graphics might be lost because of platform, software and version incompatibilities. A PDF file always displays exactly as created, even if created by a foreign software application, operating system or platform. Documents do not always print correctly due to printer/software limitations. PDF is printer independent. PDF files can be published and distributed anywhere: in print, attached to E-mail, on corporate servers, posted on Web sites, or on CD-ROM.

In light of the foregoing, it would be greatly advantageous to provide an ASP topology for online lending service providers which facilitates the flow of information throughout the mortgage lending process beginning with the consumer completion of a loan application and through submission to lenders and back, all in open Portable Document Format PDF to allow dynamic changes to the application information, and all while electronically notifying all involved parties of any action taken by the another party.

SUMMARY OF THE INVENTION

It is therefore an object of the present invention to provide an ASP topology for online lending services (inclusive of the Application Service Provider architecture, a loan origination site interface, and a secure server facility).

It is an other object to provide an architecture that incorporates various features including message queuing and electronic message prompting to stimulate real-time participation, and a novel database Adobe® PDF storage and population format that allows consumers to view their loan applications online (as can all other entities within the loan approval chain) anytime from the point of submissions through approval.

It is another object to provide an ASP topology for online lending services which automatically takes loan application data from a lead source, populates an SQL database on a secure third party ASP server with the loan application data inclusive of completed Adobe® PDF loan application stored in binary format thereon (for ready cross-platform access by all involved parties including the borrower), and then automatically migrates the data to a loan origination source such as Calyx Point, all by automatic message queuing which keeps all interested parties advised.

In accordance with the foregoing objects, the present invention is an ASP topology for online lending service providers in which Lenders subscribe to the service and Consumers use the service to apply for various types of loans from a variety of lenders. Using their Web browsers, consumers can enter credit application requests via a series of online entry forms. The data from the completed form is then be added to a central database located at a central server facility. Once the Consumer completes the entry of the appropriate forms, the data entered on the form(s), along with other credit information, is distributed to multiple lenders for their easy evaluation in accordance with their own underwriting criteria. The multiple lenders review the application and related data and, if appropriate, generate prequalifications for loan applications, which are transmitted back to the consumer. The consumer can then choose a lender from the offers and the lending process continues between the lender and the consumer. During the entire process, secure network technology, including encryption, protects the data transmitted between the consumers' browsers and the server facility and the lenders.

The present method begins with an infrastructure, i.e., the establishment of a server facility, web communications and network configuration, including network security, and software development and installation. Secure client communications are accomplished via priority security technology, such as Cisco, and include a VPN, firewalls and encryption. The server facility maintains the highest level of physical and electronic security measures as well. A communications interface connects the loan origination site (LOS) or lender with the server facility. The consumer interfaces via the Web browser. The consumer logs onto the Internet and the appropriate URL and completes an online loan application, which is edited and added to the database on the database server. The loan data and other credit information is compared to lender-specified criteria to determine suitable lenders. The interface software at the lender sites periodically checks for new data on the database server at timed intervals and transfers loan application data to the lender's system. If the lender approves the loan application, the interface exports the loan from the lender's system to the central database. The PDF is then created and stored and an email is transmitted to the consumer to advise that the application is ready to be viewed. The consumer can then log on to view his or her application in PDF. Once viewed, an email is transmitted back to the lender to inform them that the loan application has been viewed.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
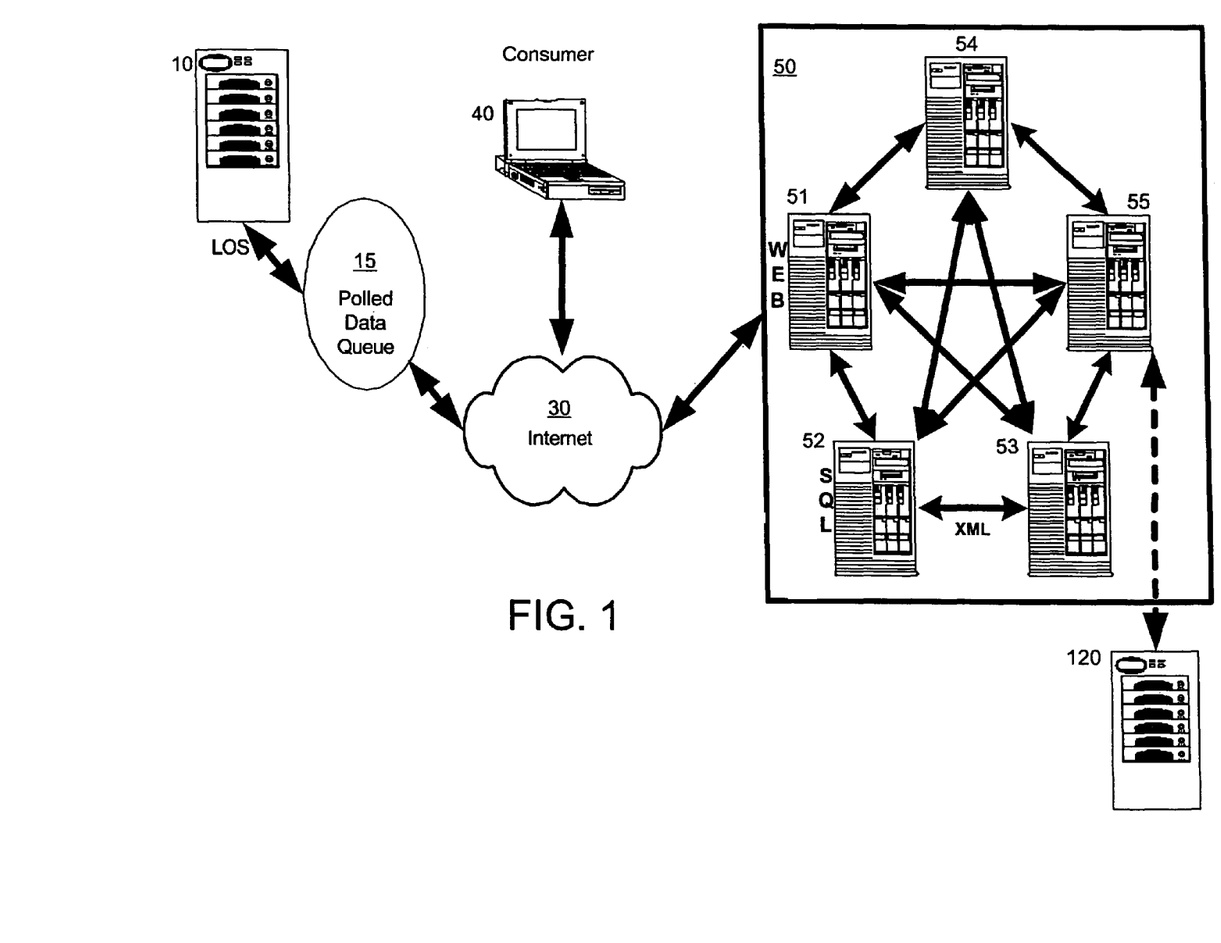
FIG. 1 is a high-level diagram of the components of the method of online lending services according to the present invention.

For purposes of concise explanation, the following acronyms shall have the meanings ascribed below.
DLL—Dynamic Link Library
DOM—Document Object Model GUI—Graphical User Interface
HTML—Hypertext Markup Language
MQ—Message Queue
SQL—Structured Query Language
SSL—Secure Sockets Layer
TCP/IP—Transmission Control Protocol/Internet Protocol
XML—Extensible Markup Language
ASP—Application Service Provider FIG. 1 is a high-level flow diagram of the electronic system for online lending services according to the present invention.

The front-end is a loan origination site (LOS) 10 running any origination software application on a server maintained by the loan origination service. There are numerous online loan origination sites such as traditional mortgage brokers and brokerage websites, a majority of which implement various mortgage pre-qualification and origination software applications such as Calyx POINT®. Consumers apply for loans at LOS 10, and either the software or the personnel at LOS 10 will typically ensure that the applications are complete, and they may pre-qualify/and/or pre-screen the loan applications. After pre-qualification, the LOS 10 will submit the loan application to one or more lenders (or a lender network such as LendingTree.com) in return for an origination fee.

The present system is a mortgage application processing system that is maintained and administered as an ASP service to host the LOS website, to integrate with the LOS 10 (and typically their server 10 running Calyx POINT® or like software), and to automatically migrate the mortgage applications from the LOS 10 to the lender(s), managing and administering the passing of data as well as communications between the two parties. The ASP service 50 is implemented via a number of back-end web-enabled servers 51-55 communicating over the Internet 30. The back-end servers are all hosted by the ASP 50 and presently employ a web-enabled Microsoft platform, with servers running Windows 2000 Advanced Server edition and MS SQL Server 2000. There are preferably five ASP servers which perform the bulk of the application processing (described in more detail with regard to FIG. 3), including a Web Server 51 to host the LOS 10 originator's customized web page and consumer interface, and an application server 53 which extracts data from the mortgage applications submitted to the LOS 10, and which hosts an automatic decision engine that processes the applications and compares the applications to lender underwriting criteria to determine compatible lenders. Data extracted from the loan applications by application server 53 is passed to an SQL data server 52 which populates an SQL database with the information, inclusive of an Adobe® Acrobat-generated application form stored in binary in the SQL database, as will be described. An MQ server 54 hosts a Queue Manager that receives and manages leads from the LOS 10, and a messaging server 55 is used to relay and send email notifications to the LOS 10 and to the lenders regarding loan status, etc. These servers 51-55 are preferably hosted on separate computers so that one can serve as an emergency hot spare for the other, but one skilled in the art will understand that the functions of servers 51-55 can be combined in a single server.

Consumers 40 can use any remote computer equipped with a conventional web browser having Adobe® Acrobat Reader® installed to use the present system, and Acrobat is required so they can view their own application as a PDF document. The consumer's web browser should support 128 bit encryption. In general operation, each consumer 40 logs on to the Internet and accesses a customized web page located on the ASP web server 51, using his or her web browser. The consumer enters and submits a loan application. The loan applications, once completed by a consumer in the various formats of the various LOS originators 10, are temporarily stored in queue 15. Queue 15 is polled intermittently by the database server 52 at the ASP server facility 50, and upon finding new application(s) the data is migrated (as will be described) via the Internet and used to populate a central SQL database stored on the database server 52. For each new loan application stored at database server 52, the MQ server 54 is notified so that the data can be processed and subjected to the lender's application engine and Automated Decision Engine in accordance with the lender 120 criteria. The application engine and Automated Decision Engine are typically third party software applications used by Lenders to process the loan applications and other credit information and compare to lender underwriting criteria to determine potential suitable lenders. The lender results inclusive of credit information and pre-approval (or denial) information is then transmitted back to the SQL database server 52 to supplement the original loan application stored therein.

Figure 2:
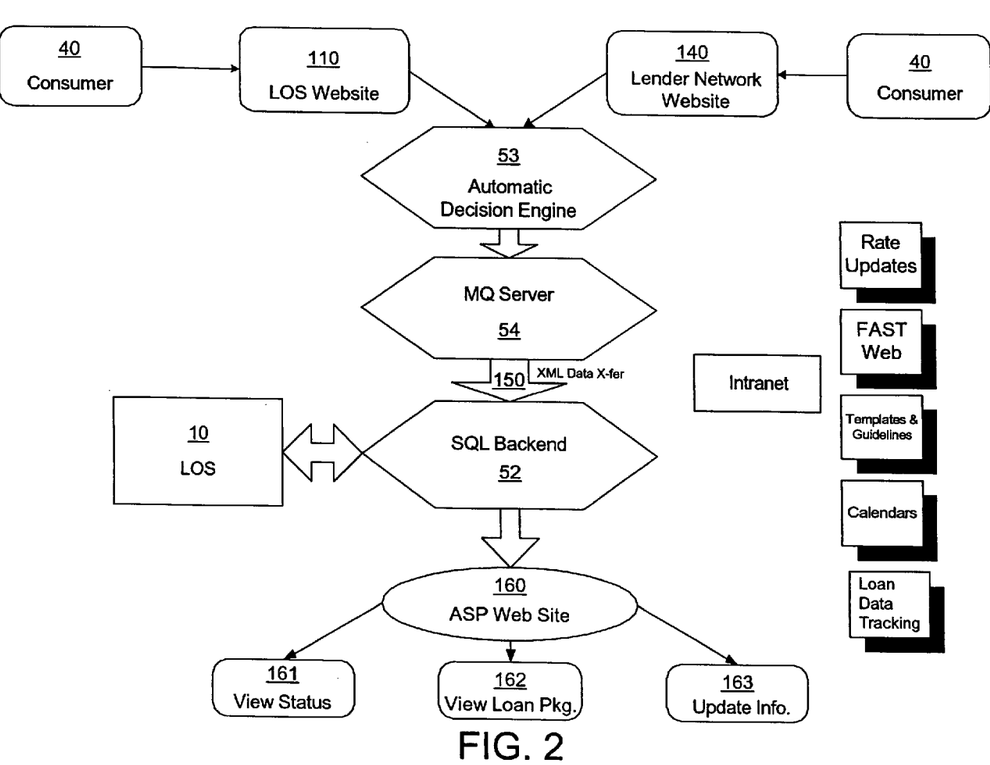
FIG. 2 is a diagram of the method of online lending services according to the present invention.

FIG. 2 is a more detailed diagram illustrating the general data flow for the ASP method of online lending services according to the present invention. Consumers (borrowers) 40 can logon to the Internet and use their web browser to gain access to the LOS website 110 (or to the Lender website 120). In accordance with the present invention, the consumer 40 is in either case redirected to the ASP-hosted website 160 resident on server 51 (see FIG. 1).

Loan application data is entered by the consumer 40 pursuant to the LOS 10 application format (typically determined by a series of forms maintained at LOS website 110) and the data may be subjected to the LOS 10 preapproval process (automatic decision engine 53). The LOS 10 data is then temporarily placed on the MQ server 54 of FIG. 1. One of the novel aspects of the present system is the way that it dynamically imports application data into its central database from the loan originators and then dynamically exports the data out to the lenders. The dynamic XML Data Transfer 150 automates data transfer to the ASP. To accomplish this (and with combined reference to FIGS. 1 & 2), the MQ server 54 hosts a Queue Manager software module that receives and manages "leads" (completed applications) from the LOS 10. Upon completion of a new application the messaging server 55 generates an email and sends it to the ASP 50 and to LOS 10 to flag the application. At specified periodic intervals, the database server 52 polls the MQ server 54 and all new application data is dynamically extracted from the existing XML (Extensible Markup Language) 150 format used by the LOS 10 into the SQL database on SQL data server 52, where it is populates the SQL database with the information. The extraction entails a data validation process (as will be described), plus a dynamic export by which certain required XML fields are pulled from the application. XML is an open standard for defining data elements on a Web page and business-to-business documents and most loan originators use it, however, it is not conducive to cross-platform access as different web browsers and operating systems will reconstruct and display the original loan application from the XML data differently (or not at all). To remedy this, in addition to the extracted XML data, the newly completed application is stored in its entirety on the database server 52 in as a binary (not text) Adobe® Acrobat PDF form file. There are three known ways to store binary data in XML documents: Base64 encoding (a MIME encoding that maps binary data to a subset of ASCII), hex encoding (where each binary octet is encoded using two characters representing hexadecimal digits), and unparsed entities (where the binary data is stored in a separate physical entity from the rest of the XML document). Any of these may suffice.

The lender's communication interface 140 also checks the database periodically at programmed intervals for new loan information and, upon finding it, the data is dynamically exported to the lender's own servers for underwriting. This is accomplished using the lenders data-mapping template. The entire loan application is then available from the database server 52 through the ASP website 160 for cross-platform viewing. The lender, the consumer, the ASP and the loan originator all can view loan status 161, view the loan package 162, and freely update information 163 as needed.

Figure 3:
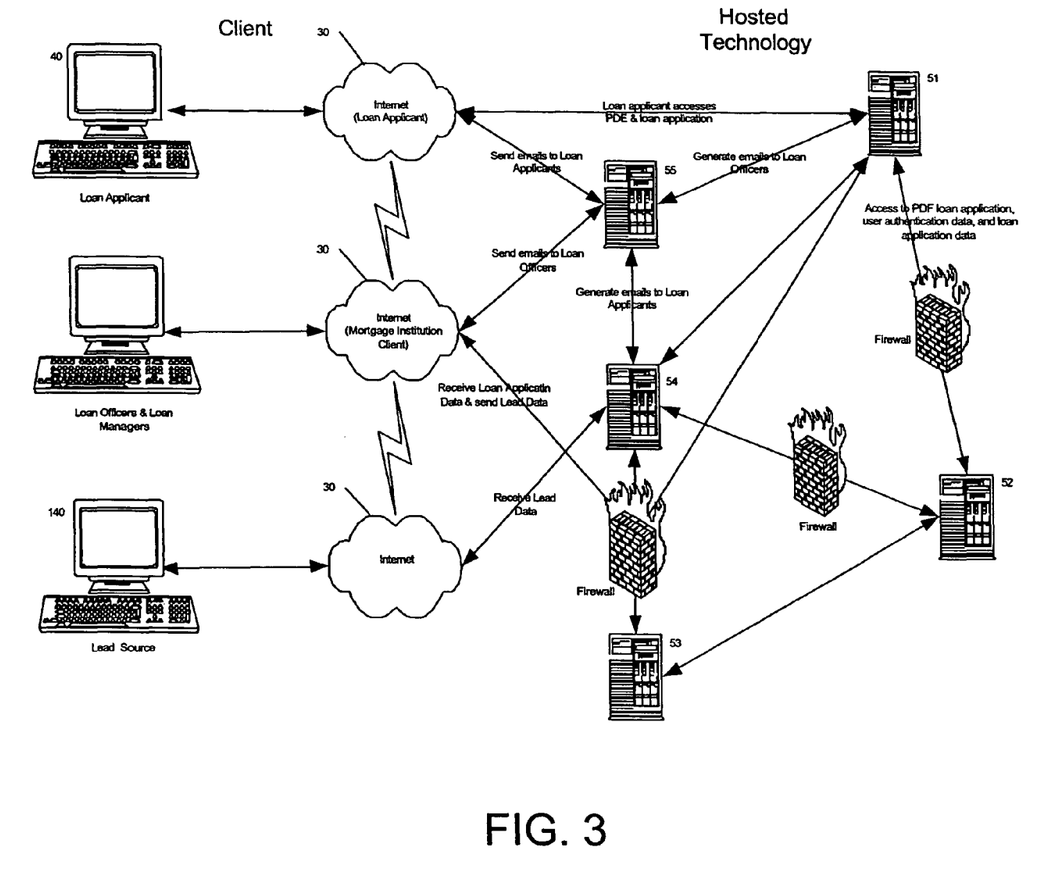
FIG. 3 is a diagram of the system architecture for the method of online lending services according to the present invention.

FIG. 3 is a more detailed diagram of the system architecture for the method of online lending services according to the present invention. The configuration of the system architecture is suited for deployment as an Application Service Provider (ASP) model, although the business can be conducted other than as an ASP. The client (consumer) 40, using its web browser, communicates with the Web server 51 that houses the LOS originator's customized web page and consumer interface. Outside access to the web server 51 is preferably controlled by a Cisco screening router and PIX firewall, which allow requests only through a secure socket layer. The Cisco PIX 500 Series Firewalls are purpose-built security appliances that provide stateful inspection firewalling, standards-based IPsec, Virtual Private Networking (VPN), intrusion protection and other security services. The PIX firewall requires that the internal and external IP addresses are configured to allow access through specified ports. This way, Consumers 40 and lenders can securely create, review, and update loan applications and review individual loan application PDF files over the Internet 30.

The SQL data server 52 hosts the populated SQL database and transfers loan data between the LOS 10 and lenders. SQL data server 52 employs standard Windows Authentication database security. Thus, access to the database on SQL data server 52 from a workstation requires that users have access the to the appropriate database objects. All the binary Adobe® PDF documents generated during extraction are stored on the SQL data server 52. Once a user has logged on using the correct credentials, they can access their loan application, disclosures, and other documents from the database.

A message queue MQ Server 54 communicates with the Web Server 51, and MQ Server 54 is used as a messaging queue to receives all leads from the LOS 10. A dedicated mail server 55 sends emails to loan applicants and loan officers, which are generated from the MQ Server 54 and Web server 51, respectively. This way, loan officers and loan applicant scan receive, access, and update loan information and emails over the Internet 30.

The Web Server 51, SQL data server 52 and MQ Server 54 may all be Intel x86-based servers running Microsoft Windows 2000 Advanced Server. SQL data server 52 may run Microsoft SQL Server 2000. Application 53 preferably runs Windows 2000 Advanced Server and IIS. These servers are preferably hosted on separate computers so that one can serve as an emergency hot spare for the other. Interprocess communication takes place across the Ethernet network using TCP/IP and through shared files.

Figure 4:
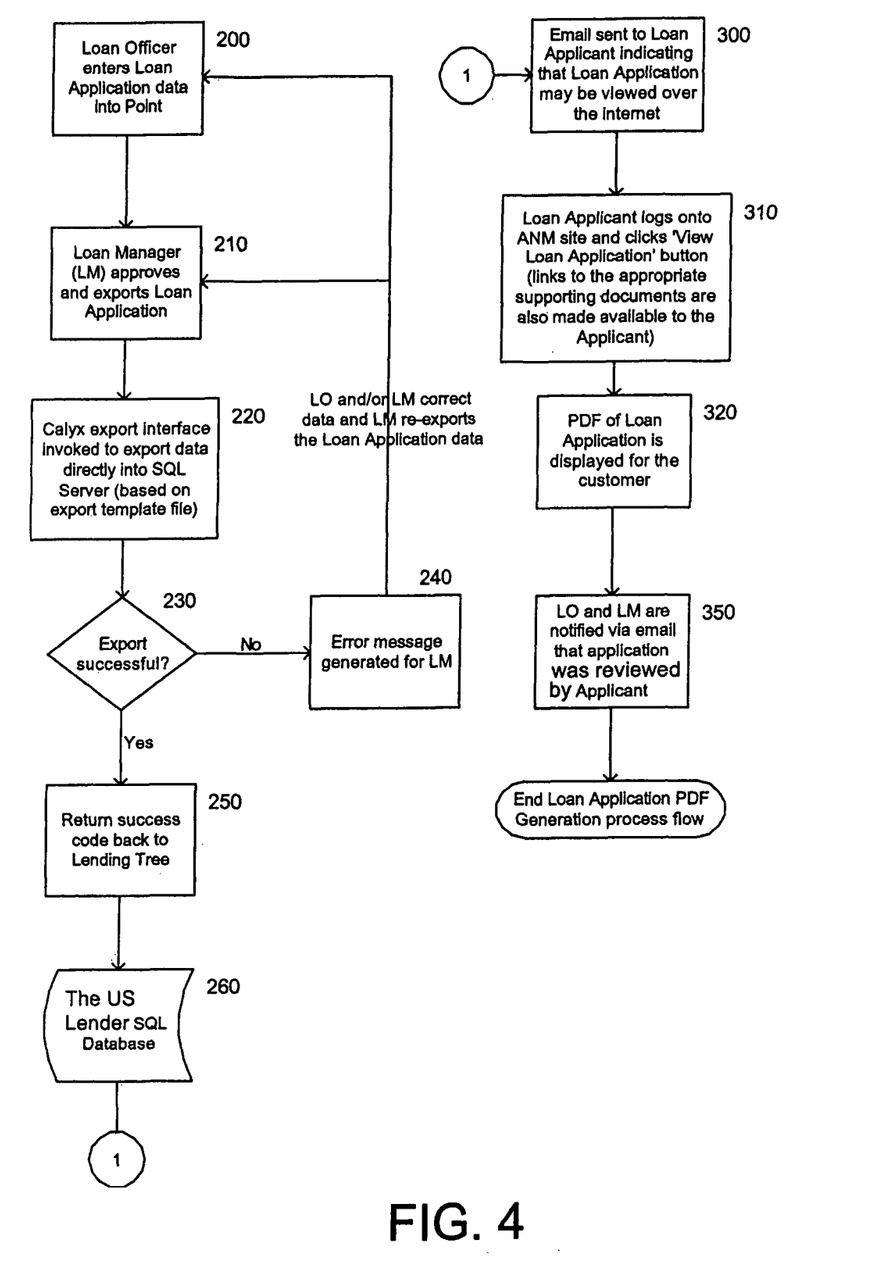
FIG. 4 is a diagram illustrating the flow of the data of the method of online lending services according to the present invention.

FIG. 4 is a diagram illustrating the method of data flow in importing data into the LOS 10 database from the ASP-maintained SQL Database 52 (see FIG. 2). For example, this sequence is followed to get the data into Calyx Point®.

At step 200, a Loan Officer at LOS 10 initiates the transfer of the new loan application by entering the loan application data into Point.

At step 210, the Loan Manager approves the loan and exports the loan application to the MQ server 54.

At step 220, the SQL Server 52 polls the MQ server 54 and, when it finds a new loan application originated at LOS 10, it automatically imports data based on the export template file.

At step 230, a validation process occurs (this occurs for each new loan application originated by client 30 at LOS 10). An array of required fields need to be completed in order for the extraction to go through successfully, and the validation process ensures that this was done:
  Loan Amount
  Interest Rate
  Term Months
  Due Months
  Customer Name
  Customer email address
  Customer SSN
  Loan Purpose
  Mortgage Type
  Date Opened
  Truth-In-Lending data for the monthly payments
  Declarations
  Assets and Liabilities have data
  The presence of these fields is verified at step 230.

When errors occur from within the web application, at step 240 an error message will be generated and sent to the Loan Manager. The Loan Manager and/or the Loan Officer correct the data and the Loan Manager re-exports the Loan Application data. Additionally, the application server 53 logs all errors. Specifically, all errors area trapped and sent to a local log file that resides on the application server 53. The error messages are stored in the message queue on MQ Server 54 (LTLead.Dead.Letter.Q) which is designed to queue all errors. A trigger running on the queue calls a process called ErrorEmailHandler.exe, which extracts the message and calls the component that sends the email 240 to the SMTP email account indicating the error.

If validation is successful, at step 250 a success code is returned to LOS 10 (here Lending Tree). An LOS Lead data file is then placed in queue 15 (see FIG. 1) 260. Queue 15 is periodically polled for any QF XML documents that were received from LOS 10. If a QF (qualification form) is in queue 15, this triggers a dynamic import by which lead data is imported into queue 15 into SQL server 52. Specifically, the ASP page instantiates a COM+component, which takes the XML data and puts it onto the Message Queue (Incoming_Lead). A trigger is running on this MQ, which calls an ActiveX EXE (GetMQMessage.EXE) to process the message. The EXE instantiates a COM+component (LTXMLImport) that passes the XML data. The COM+component, which is VB ActiveX DLL, is responsible for parsing the XML data into MS XML DOM (Document Object Model) and finally inserting the data into SQL Server 52.

On successful insertion of data into SQL Server 260, the COM+component makes a call to another component for starting the process of creating the prospect file for Calyx Point. A COM+component is used to retrieve the SQL data inserted and creating and ASCII text data string which is needed as a parameter for the import.exe. The COM+component, which is VB ActiveX DLL, is responsible for parsing the XML data into MS XML DOM (Document Object Model) and finally inserting the data into SQL Server 52. The ASCII text string is put on anotherMQ (LTLead.Import.Point.Q).

At step 300, on successful insertion of data into SQL Server, an email is sent to the Loan Applicant through the messaging server 53 indicating that the Loan Application may be viewed over the internet.

At step 310, the Loan Applicant logs onto the site and clicks the 'View Loan Application' button. The appropriate supporting documents are then made available to the applicant. Preferably, the loan applicant reviews loan application over the internet (whereupon the loan officer is notified that the application was reviewed) 320. Whenever a consumer logs into the web site an e-mail is sent to the LOS 10 and the appropriate sales agent displaying the consumer name and the information of that the application. When the client's review is complete the loan officer is electronically notified by message queue MQ Server 53 that the application has been reviewed. The loan officer designates that the application is ready for processing.

After linking, the PDF version of the application is displayed for the customer to review 320. Finally, the Loan Officer and Loan Manager are notified via an email generated by the messaging server 55 that the application was reviewed by the applicant.

Completed (designated) application files are then automatically and dynamically exported as described above to multiple lenders for their easy evaluation in accordance with their own criteria which are applied by their own automatic decision engines (this processes the application and other credit information and compares the application to lender underwriting criteria to determine compatible lenders). This way, the multiple lenders can review the application and related data and, if appropriate, generate prequalifications or denials for loan applications.

Message queues on MQ Server 53 are used for acknowledgments and notifications between the participants. All user authorization and loan data are housed on the database server 52, which is protected by firewalls 59 (see FIG. 3). Given multiple pre-qualifications, a consumer can then choose a lender from the offers and the lending process continues between the lender and the consumer. During the entire process, secure network technology, including encryption, protects the data transmitted between the consumers' browsers and the server facility and the lenders Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

I claim:

1. A system for providing an online loan origination service, comprising:
   an application server having an Internet interface and configured to receive a loan application having loan application data, wherein the loan application data is in an Extensible Markup Language (XML) format, configured to automatically extract the loan application data, and hosting an automatic decision engine, wherein the automatic decision engine is configured to automatically process the loan application data and compare the loan application data to lender underwriting criteria to determine one or more compatible lenders;
   a database server coupled to the application server, comprising a database pre-loaded with a PDF generated application form, and configured to receive the extracted loan application data, further configured to automatically populate a binary Portable Document Format (PDF) form file with the extracted loan application data, and further configured to automatically store the binary PDF form file loan application populated with the extracted XML loan application data for cross-platform access and viewing; and
   a queue manager server coupled to the application server and the database server, wherein the queue manager server is configured to receive the loan application from the application server and wherein the database server is further configured to poll the queue manager server at specified periodic intervals and to receive the transfer of the loan application data from the queue manager server in response to a poll.

2. The system of claim 1, wherein the binary PDF form file populated with the extracted loan application data and the extracted XML loan application data are stored in a Structured Query Language (SQL) database residing on the database server.

3. The system of claim 1, wherein the application server is further configured to provide access to the binary PDF form file populated with the extracted loan application data stored in the database server to an authorized user via the Internet based on a receipt of credential information relating to the authorized user.

4. The system of claim 1, further comprising a messaging server coupled to the application server and the database server, wherein the messaging server is configured to generate an electronic message including information relating to a status of the loan application.

5. The system of claim 1, wherein the population, by the database server, of the binary PDF form file with the extracted loan application data includes Base 64 encoding.

6. The system of claim 1, wherein the population, by the database server, of the binary PDF form file with the extracted loan application data includes hexadecimal encoding.

7. The system of claim 1, wherein the population, by the database server, of the binary PDF form file with the extracted loan application data includes using unparsed entities.

8. A computer-implemented method of providing an online loan origination service, comprising:
   receiving, by a computer server configured to receive, a loan application having loan application data from a user via the Internet, wherein the loan application data is in an Extensible Markup Language (XML) format;
   automatically extracting, by the computer server further configured to automatically extract, the loan application data;
   receiving, by a database server comprising a pre-loaded PDF generated application form, configured to receive, the extracted loan application data;
   automatically populating, by the database server further configured to populate, a binary Portable Document Format (PDF) form file with the extracted loan application data;
   automatically storing, by the database server further configured to store, the binary PDF form file populated with the extracted loan application data in a SQL format for cross-platform access and viewing;
   receiving, by a queue manager server coupled to the computer server and the database server and configured to receive, the loan application from the computer server;
   polling, by the database server further configured to poll, the queue manager server at specified periodic intervals to receive the transfer of the loan application from data the queue manager server in response to a poll;
   automatically processing, by the computer server hosting an automatic decision engine configured to automatically process, the loan application data; and automatically comparing, by the computer server hosting the automatic decision engine configured to automatically compare, the loan application data to lender underwriting criteria to determine one or more compatible lenders.

9. The method of claim 8, further comprising:
receiving, at the computer server further configured to receive, credential information relating to an authorized user via the Internet; and
providing access, at the application server further configured to provide access, to the binary PDF form file populated with the extracted loan application data to the authorized user.

10. The method of claim 8, further comprising generating, at a messaging server configured to generate, an electronic message including information relating to a status of the loan application.

11. The method of claim 8, wherein the step of populating the binary PDF form file with the extracted loan application data comprises using Base 64 encoding.

12. The method of claim 8, wherein the step of populating the binary PDF form file with the extracted loan application data comprises using hexadecimal encoding.

13. The method of claim 8, wherein the step of populating the binary PDF form file with the extracted loan application data comprises using unparsed entities.

14. A device for processing an online loan application, comprising:
a computer configured to receive, via the Internet, a loan application having loan application data, wherein the loan application data is in an Extensible Markup Language (XML) format;
a processor coupled to an interface and configured to receive and automatically extract loan application data, and further configured to automatically populate a binary Portable Document Format (PDF) form file with the extracted loan application data, and hosting an automatic decision engine, wherein the automatic decision engine is configured to automatically process the loan application data and compare the loan application data to lender underwriting criteria to determine one or more compatible lenders;
a database comprising a pre-loaded PDF generated application form, coupled to the processor, and configured to automatically store the binary PDF form file populated with the extracted loan application data; and
wherein the computer is further configured to transfer the loan application to a queue manager server, and wherein the processor is further configured to poll the queue manager server at specified periodic intervals and to receive the transfer of the loan application data from the queue manager server in response to a poll.

15. The device of claim 14, wherein the binary PDF form file populated with the extracted loan application data and the extracted XML loan application data are stored in a Structured Query Language (SQL) database.

16. The device of claim 14, wherein the processor is further configured to cause the interface to provide access to the binary PDF form file populated with the extracted loan application data to an authorized user via the Internet based on a receipt of credential information relating to the authorized user.

17. The device of claim 14, wherein the processor is further configured to generate an electronic message providing information relating to a status of the loan application and to cause the generated electronic message to be transmitted on the Internet via the interface.

18. The device of claim 14, wherein the population, by the processor, of the binary PDF form file with the extracted loan application data includes Base 64 encoding.

19. The device of claim 14, wherein the population, by the processor, of the binary PDF form file with the extracted loan application data includes hexadecimal encoding.

20. The device of claim 14, wherein the population, by the processor, of the binary PDF form file with the extracted loan application data includes using unparsed entities.

* * * * *